United States Patent [19]
Gunderson

[11] Patent Number: 5,518,276
[45] Date of Patent: May 21, 1996

[54] QUICK CONNECTOR WITH PULL BACK VERIFICATION METHOD

[75] Inventor: Stephen H. Gunderson, Marine City, Mich.

[73] Assignee: Bundy Corporation, Warren, Mich.

[21] Appl. No.: 308,087

[22] Filed: Sep. 16, 1994

[51] Int. Cl.$^6$ .................................................. F16L 35/00
[52] U.S. Cl. ........................... 285/93; 285/319; 285/921
[58] Field of Search ............................. 285/93, 319, 921

[56] References Cited

U.S. PATENT DOCUMENTS

| | | |
|---|---|---|
| 2,661,768 | 12/1953 | Novak et al. . |
| 4,035,005 | 7/1977 | DeVincent et al. . |
| 4,712,810 | 12/1987 | Pozzi . |
| 4,753,458 | 6/1988 | Case et al. . |
| 4,781,400 | 11/1988 | Cunningham . |
| 4,875,715 | 10/1989 | Dennany, Jr. et al. . |
| 4,895,396 | 1/1990 | Washizu . |
| 4,913,467 | 4/1990 | Washizu . |
| 4,915,420 | 4/1990 | Washizu . |
| 4,925,217 | 5/1990 | Ketcham . |
| 4,936,544 | 6/1990 | Bartholomew ........................... 285/319 |
| 4,946,205 | 8/1990 | Washizu . |
| 4,948,176 | 8/1990 | Bartholomew . |
| 4,979,765 | 12/1990 | Bartholomew . |
| 4,981,586 | 1/1991 | Bartholomew ........................... 285/319 |
| 5,069,424 | 12/1991 | Dennany, Jr. et al. . |
| 5,112,084 | 5/1992 | Washizu ................................... 285/319 |
| 5,131,691 | 7/1992 | Washizu ................................... 285/319 |
| 5,152,555 | 10/1992 | Szabo . |
| 5,161,833 | 11/1992 | McNaughton et al. ................. 285/319 |
| 5,163,720 | 11/1992 | Abe ......................................... 785/319 |
| 5,178,424 | 1/1993 | Klinger . |
| 5,226,679 | 7/1993 | Klinger . |
| 5,228,728 | 7/1993 | McNaughton et al. . |
| 5,297,818 | 3/1994 | Klinger . |
| 5,303,963 | 4/1994 | McNaughton et al. . |
| 5,342,099 | 8/1994 | Bahner et al. . |

*Primary Examiner*—Eric K. Nicholson
*Attorney, Agent, or Firm*—Dorn, McEachran, Jambor & Keating

[57] ABSTRACT

A quick connector coupling for forming a joint in a fluid line system comprises a female connector body having a bore which receives a male member. A retainer disposed within the bore includes retention legs which have members that extend between abutment surfaces formed within the connector body and an upset formed on the male member to retain the male member within the bore. The retainer also has latching verification legs which extend out of the bore and engage abutment surfaces exterior to the bore to fix the axial position of the retainer and to provide visual verification of a proper coupling.

8 Claims, 5 Drawing Sheets

5,518,276

QUICK CONNECTOR WITH PULL BACK VERIFICATION METHOD

FIELD OF THE INVENTION

This invention relates to fluid line systems which include quick connector couplings, and more particularly to a quick connector coupling having means to visually indicate whether a proper connection has been made between the male and female portions of the quick connector.

CROSS-REFERENCE

This application is related to a copending U.S. patent application, Ser. No. 08/307,378 filed on even date herewith, entitled "Quick Connector With Tube Activated Check Valve", having common inventor and assignee of interest.

BACKGROUND OF THE INVENTION

In automotive and other fields, quick connector couplings are often utilized to provide a fluid connection between two components or conduits, thus establishing a fluid line between the two components, usually a rigid tube and a system element contained within a metal housing. Use of quick connector couplings is advantageous in that a sufficiently sealed and secured fluid line may be established with a minimum amount of time and expense.

An improper connection between the male member and female connector body of a quick connector coupling can have deliterious effects on the fluid line system. At the very least, a leak in the fluid system will occur at the site of the improper connection. More serious and potentially dangerous consequences can result if the fluid is pressurized, as is often the case in automotive fluid systems. Thus, a reliable and accurate means for verifying a proper connection between the male member and female connector body is desirable.

Audible verification of a proper connection is sometimes possible. Typically, as the male member is inserted into the female connector body, an audible "click" is heard when the male member locks into place. The click results from resilient arms of a retainer contained within the female connector body snapping into place behind an enlarged upset portion formed on the male member. Reliance on audible verification is generally ill-advised. The click may be very quiet or inaudible, making its detection difficult. Background noise in the workplace can make the task even more difficult. And, of course, this method of verification is inherently limited by the quality of the installer's hearing.

A proper coupling may be physically verified by tugging or pulling on the male member. An improper connection is obvious if the male member disengages the female connector body. Physical verification may also be deficient in several respects. The pulling or tugging force exerted on the male member may not be enough to cause the male member to disengage the connector body even though an improper connection in fact exists. Furthermore, since the pull back to check for proper connection is not a necessary step in the assembly process, assemblers often miss or skip the pull back verification step.

Generally, visual methods of connection verification have proven to be quite reliable. Various methods and mechanisms for visual verification of proper connection of a quick connector coupling are shown in U.S. Pat. Nos. 5,178,424, 5,152,555, 5,069,424, 4,979,765, 4,948,176, 4,946,205, 4,925,217, 4,915,420, 4,913,467, 4,895,396, 4,793,637 and 4,753,458.

The methods of visual verification shown in these patents also have various shortcomings. In particular, all require the use of an additional indicator mechanism or component. The requirement of an additional component increases the costs of both manufacture and assembly. Furthermore, the indicator mechanisms employed in some of these prior connectors are overly complex and may protrude an objectionable amount from the connector body. Also, "looking" at the indicator mechanism to verify a proper connection is not a necessary step in the assembly process. Thus, as with physical methods of verification, there is the risk that the assembler will skip or miss the verification step.

A need exists for a visual method of verification which (1) does not add an extra component to the coupling; and (2) is a required step in the assembly process. The quick connector coupling of the present invention meets this need.

SUMMARY OF THE INVENTION

The present invention provides a quick connector coupling having a visual method of verification which does not require added components and which is a required step in the assembly process.

The coupling includes a female connector body defining a bore which extends axially inwardly into the connector body from an entrance. A radial rim formed in the connector body adjacent the entrance defines an interior abutment surface and an exterior abutment surface. A male member is received within the bore of the connector body and has an enlarged upset portion.

A retainer is disposed within the bore of the connector body. It includes retention legs which have members that extend between the upset portion of the male member and the interior abutment surface to retain the male member within the bore. The retainer also has latching verification legs having portions which extend outwardly of the bore and engage the exterior abutment surface to fix the axial position of the retainer and to provide visual verification of a proper connection.

In a method of assembly according to the present invention, the retainer is inserted into the bore of the connector body such that the latch portions of the latching verification legs are spaced axially inwardly of the exterior abutment surface. The male member is then inserted into the bore until the upset portion is axially inwardly of the terminating portions of the retention legs and is thus retained in the bore. The male member is then displaced or pulled axially outwardly until the latch portions of the latching verification legs engage the exterior abutment surface of the connector body, indicating a proper coupling.

DETAILED DESCRIPTION OF PREFERRED EMBODIMENTS

Figure 1:
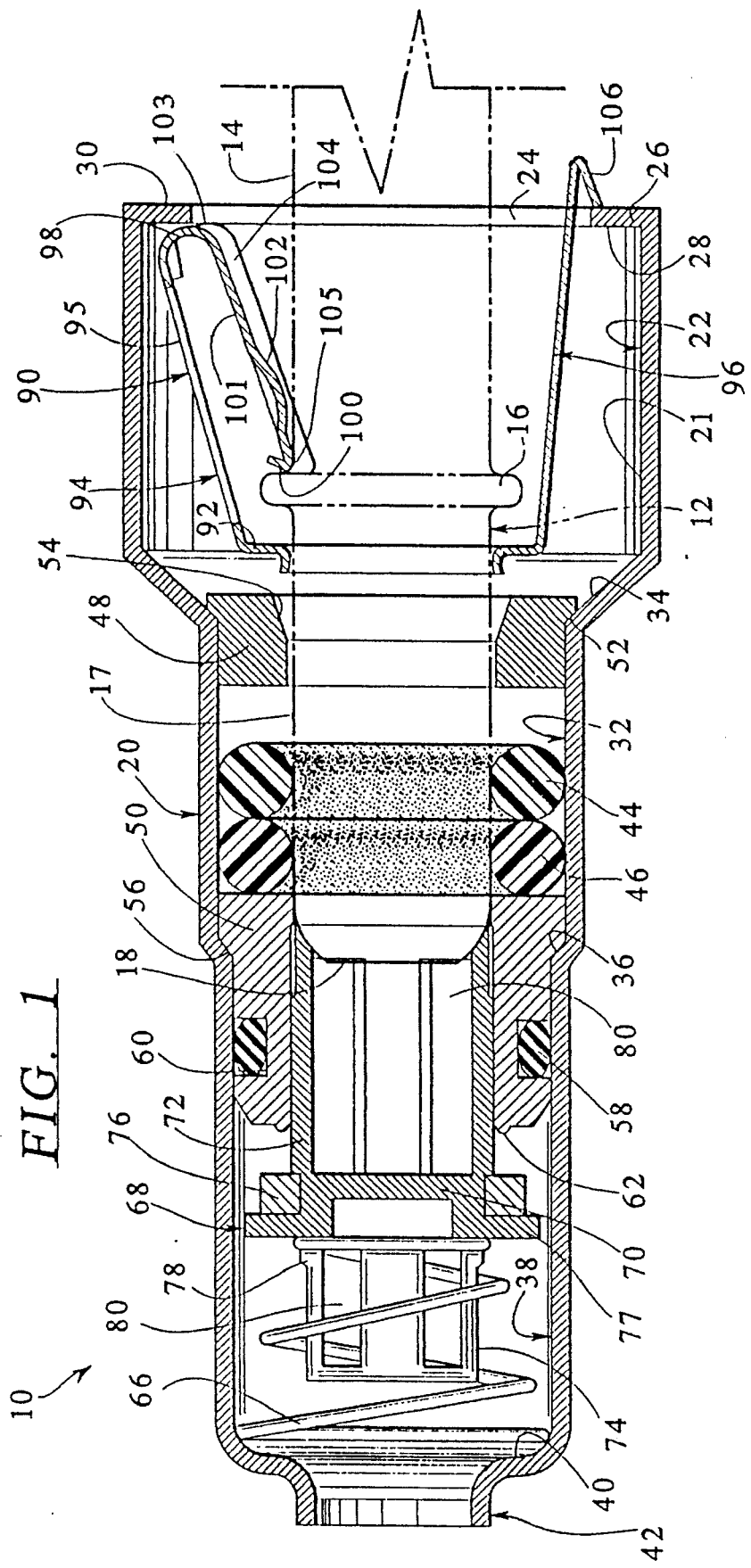
FIG. 1 is a partial sectional view of a quick connector coupling which embodies the present invention, shown in a fully assembled position.

A quick connector coupling formed in a fluid line system is designated as 10 in FIG. 1. Quick connector coupling 10 is comprised of a female connector body 20 and a male member 12 formed at an end of a tube 14 which forms a part of a fluid line system. In use, connector body 20 is, in turn, connected to flexible tubing (not shown) which is also a component of the fluid line system. Female connector body 20 and male member 12 are connectable to form a permanent, but severable, joint.

Female connector body 20 is hollow and defines an axial bore 21 extending inwardly from an entrance 24. Connector body 20 is preferably made of a metallic material, such as stainless steel. Entrance 24 is defined by a radial annular rim 26, which in turn defines an interior abutment surface 28 and an exterior abutment surface 30. Enlarged retainer housing portion 22 is formed in connector body 20 inwardly of rim 26.

Seal housing portion 32 is formed in connector body 20 inwardly of retainer housing portion 22. Seal housing portion 32 is of reduced diameter relative to retainer housing portion 22 and extends between a first conical shoulder 34 adjacent retainer housing portion 22 and a second conical shoulder 36 remote from retainer housing portion 22.

Check valve housing portion 38 is formed in connector body 20 inwardly of seal housing portion 32. Valve housing portion 38 is of reduced diameter relative to seal housing portion 32 and extends between second conical shoulder 36 and an annular spring seating surface 40.

Tubing connection portion 42 is formed at an end of connector body 20 remote from entrance 24. Connection portion 42 is only partially illustrated in FIG. 1. Typically, barbs will be formed in its exterior to facilitate connection to flexible tubing and an open end will provide communication with the flexible tubing. Connection portion 42 could be configured in alternative ways for connection to other system arrangements. For example, threads could be formed in its outer periphery to facilitate connection within a threaded bore of a housing containing a system component.

Male member 12 is received within connector body 20 and includes an enlarged upset 16 formed a given distance from an open end 18. Open end 18 is in fluid communication with bore 21 of connector body 20. A cylindrical surface 17 extends between upset 16 and end 18. Male member 12 is typically formed at the end of a rigid, metal tube 14.

Disposed within seal housing portion 32 are an outer annular "O" ring seal 44 and an inner annular "O" ring seal 46. "O" ring seals 44 and 46 surround male member 12, forming a fluid-tight seal between cylindrical surface 17 of male member 12 and seal housing portion 32 of connector body 20. "O" ring seals 44 and 46 are secured within bore 21 between outer spacer 48 and check valve guidance sleeve 50. Outer "O" ring seal 44 is preferably made of toughened fluorosilicone and inner "O" ring seal 46 is preferably made of a fluorosilicone-fluorocarbon blend.

Spacer 48 and sleeve 50 also surround male member 12, having inner diameters just slightly larger than the outer diameter of cylindrical surface 17 of male member 12. Spacer 48 and sleeve 50, preferably made of 23% glass-filled nylon-12, fit tightly and snugly within bore 21. Outer spacer 48 includes a conical seat 52 which seats against conical shoulder 34 of connector body 20 to position spacer 48 within bore 21. Spacer 48 also includes a chamfered guide portion 54 to assist and guide the insertion of male member 12.

Check valve sleeve 50 extends into check valve housing portion 38 of connector body 20 and includes a conical seat 56 which seats against second conical shoulder 36 to position sleeve 50 within bore 21. A third annular "O" ring 58 is disposed in a groove 60 formed in the exterior of sleeve 50. "O" ring 58 provides a fluid seal between sleeve 50 and check valve housing portion 38. It is preferably made of a fluoroelastomer, such as fluoroelastomers manufactured under the trademark "Viton". A ring-shaped valve seat 62 is formed on the innermost end of sleeve 50.

A spring 66 and a plunger 68 are also disposed in check valve portion 38 of connector body 20. Spring 66 is preferably formed of stainless steel and plunger 68 is preferably formed of 23% glass-filled nylon-12. Plunger 68 comprises a solid central portion 70, a hollow outer cylindrical portion 72 extending outwardly from central portion 70 and into sleeve 50, and a hollow inner cylindrical portion 74 extending inwardly from central portion 70. A seal in the form of an "O" ring 76 surrounds, and is retained on, central portion 70 between a flange 77 and outer cylindrical portion 72. "O" ring 76 has a square cross-section and is preferably made of a high fluorine fluoroelastomer, such as fluoroelastomers manufactured under the trademark "Viton". The outer diameters of seal 76 and flange 77 are less than the inner diameter of check valve housing portion 38, allowing fluid to flow around central portion 70 of plunger 68.

Spring 66 is conically-shaped, extending between a larger diameter end which seats against spring seating surface 40 of connector body 20, and a smaller diameter end which surrounds inner cylindrical portion 74 of plunger 68. The smaller diameter end of spring 66 is retained on inner cylindrical portion 74 between flange 77 of central portion 70 and a barb 78 formed on the exterior of inner cylindrical portion 74.

Axially-extending windows, or cut-out portions, 80 extend through cylindrical portions 72 and 74 of plunger 68. When coupling 10 is fully assembled, as in FIG. 1, the check valve is open and permits fluid flow through the coupling. End 18 of male member 12 contacts the open end of outer cylindrical portion 72 of plunger 68, pushing plunger 68 inwardly and compressing spring 66. Windows 80 of cylinder 72 extend beyond sleeve 50, permitting fluid communication between male member 12 and tubing connection portion 42 of connector body 20.

Figure 3:
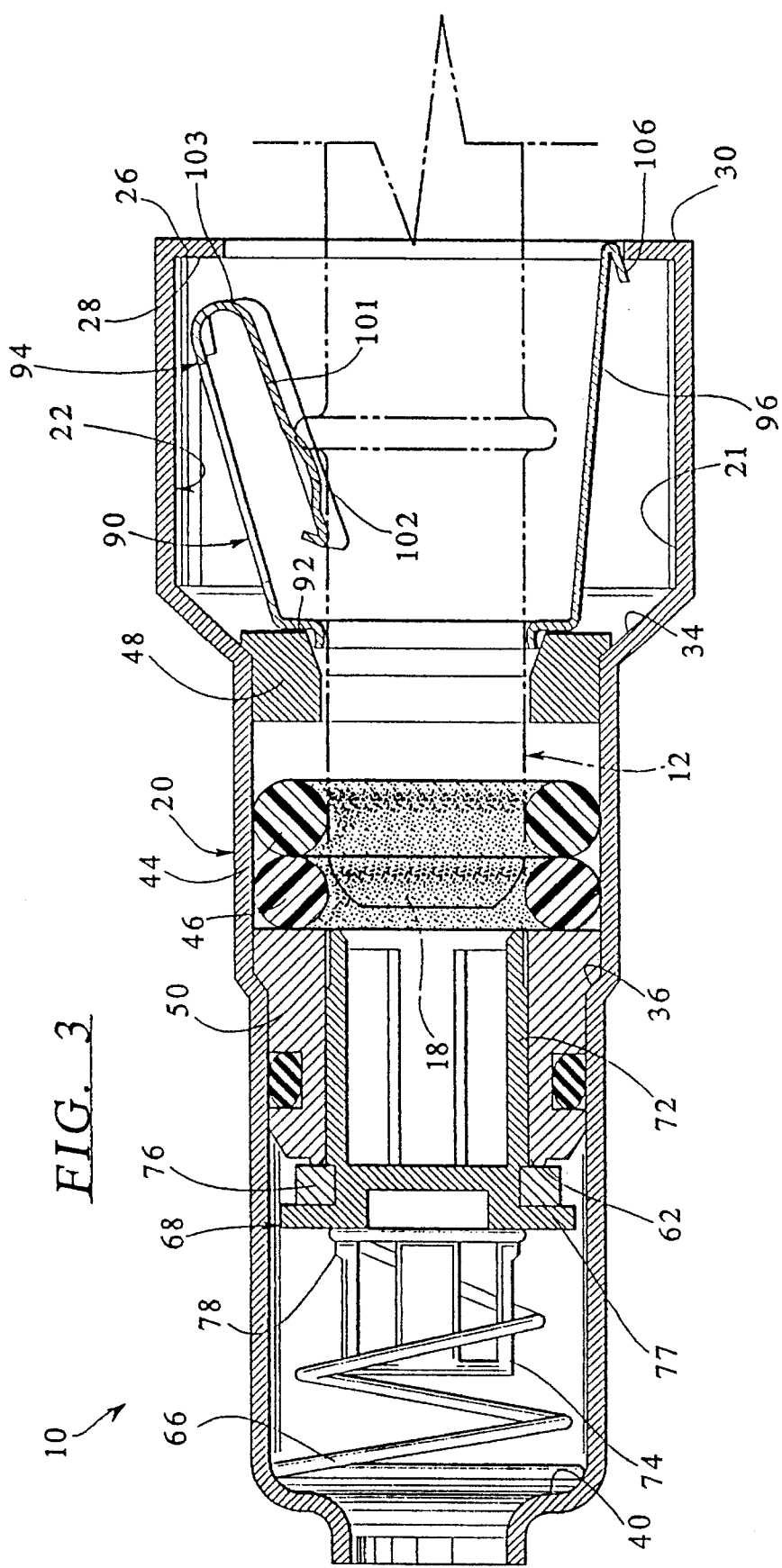
FIGS. 3–5 are a series of partial sectional views illustrating assembly steps for the quick connector coupling depicted in FIG. 1.

When coupling 10 is disconnected, as in FIG. 3, the check valve is closed and does not permit fluid flow through the coupling. End 18 of male member 12 does not contact the open end of plunger cylindrical portion 72. Spring 66 expands, pressing seal 76 against valve seat 62 formed on sleeve 50 and effectively cutting off the fluid flow path through the coupling.

Figure 2:
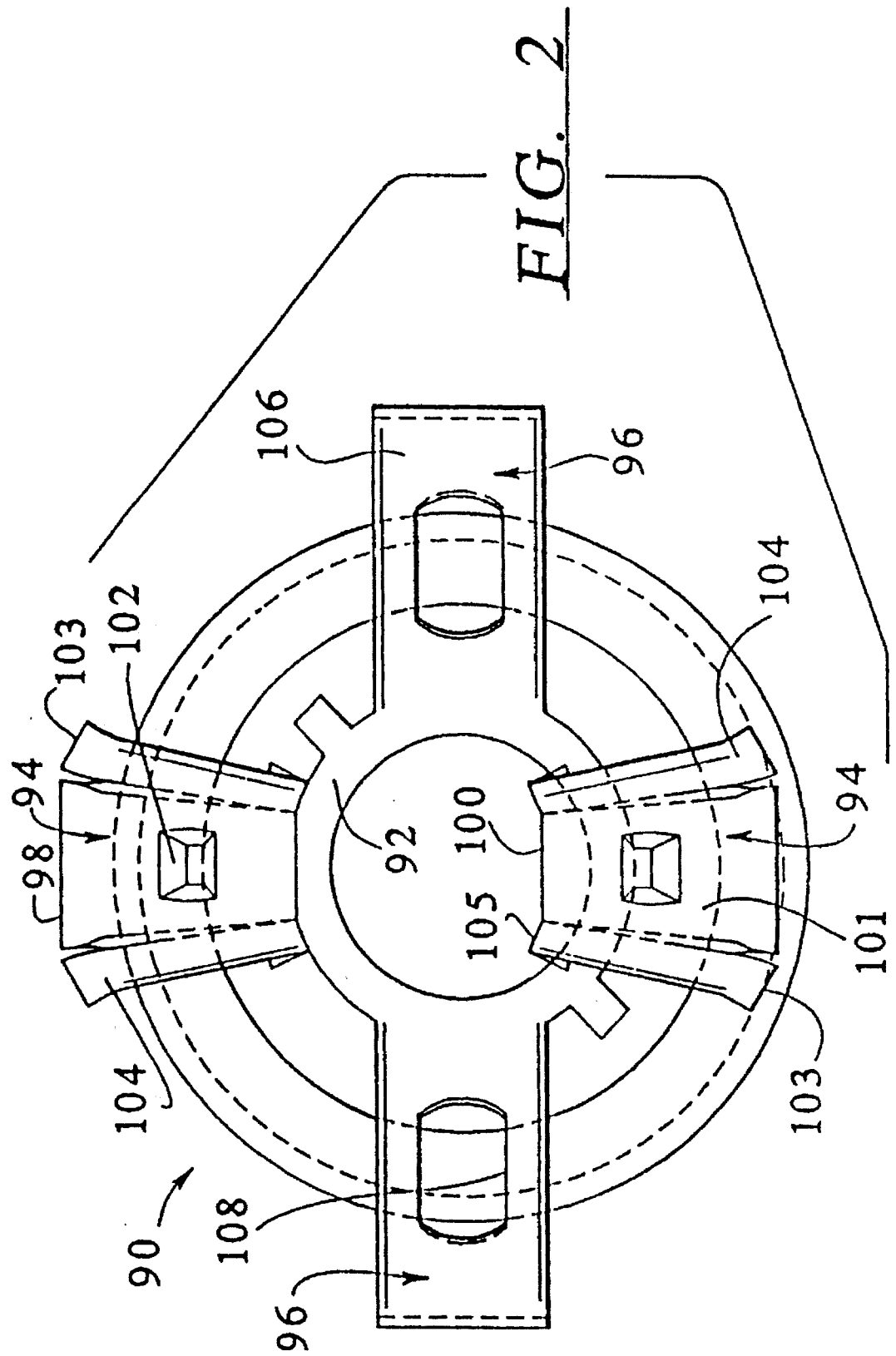
FIG. 2 is front elevation view of a pull back retainer which is a part of the quick connector coupling of FIG. 1.

A pull back retainer 90, illustrated in more detail in FIG. 2, is disposed within retainer housing section 22 of connector body 20. Retainer 90 may be made of metal or, depending on its application, plastic.

Retainer 90 includes a hollow, annular ring 92 which surrounds male member 12. Ring 92 has an interior diameter which is approximately the same as the exterior diameter of cylindrical surface 17 of male member 12. Four legs are spaced equidistantly about the circumference of ring 92: a pair of 180 degree opposed retention legs 94 and a pair of 180 degree opposed latching verification legs 96. In FIGS. 1 and 3–5, a latching verification leg is shown 90 degrees out of alignment so that both legs may be illustrated.

Each retention leg 94 includes a support member 95, a retaining member 101 and two wings 104. Support members 95 extend away from ring 92 to first bends 98. Legs 94 reverse direction at bends 98. Retaining members 101 continuous with support members 95 extend from bends 98 back toward ring 92 to second leg bends 100. Bends 100 are spaced from ring 92 and contact upset 16 to secure male member 12 in connector body 20. Retaining members 101 are positioned "underneath" support members 95. Ramped bumps 102 may be formed on retaining members 101 to provide enhanced stiffness to members 101 and enhanced resistance to insertion of male member 12.

Wings 104 extend circumferentially from the lateral edges of retaining members 101. They extend between an outer wing bend 103, remote from ring 92, and an inner wing bend 105, adjacent second leg bends 100.

Wings 104 extend to a position more remote from retainer ring 92 than do retaining members 101. Stated another way, wing bends 103 are spaced further from ring 92 than are leg bends 98. Thus, in operation, outer wing bends 103 contatct interior abutment surface 28 defined by annular rim 26 of connector body 20 to secure retainer 90 within bore 21. Leg bends 98 are held out of contact with body 20 during normal operation. Inner wing bends 105 contact upset 16 to assist second leg bends 100 in retaining male member 12 within connector body 20.

Latching verification legs 96 extend axially and radially outwardly of retainer ring 92 to latches 106. Apertures 108 may be formed in legs 96 to facilitate use of a tool to install retainer 90. When fully assembled as shown in FIG. 1, latches 106 are positioned outwardly of entrance 24 and engage exterior abutment surface 30 defined by rim 26 of connector body 20. The method by which latches 106 arrive at this position is a very important part of the present invention, and is described in detail below. Verification legs 96 serve two functions: (1) they provide a visual indication that a proper coupling has been achieved; and (2) they prevent inward axial displacement of retainer 90.

Prior to insertion of male member 12 into connector body 20, the check valve, seal and retainer elements are installed in connector body bore 21. Spring 66 is inserted into bore 21 and seated against seating surface 40. Plunger 68, with seal 76 fitted on, is then inserted until spring 66 snaps into place around inner cylindrical portion 74 between barb 78 and flange 77 of central portion 70. Next, check valve sleeve 50 is fit into bore 21 against second conical shoulder 36. "O" rings 44 and 46 are inserted to rest against sleeve 50. Outer spacer 48 is then fit against first conical shoulder 34 to secure the "O" rings in place.

Finally, retainer 90 is inserted into retainer housing portions 22. Legs 94 and 96 are flexed inwardly to clear rim 26 and gain entry into bore 21. An installation tool having prongs may be used in conjunction with apertures 108 formed on latching verification legs 96 to assist in this endeavor. Retainer 90 should be initially inserted into bore 21 as far as possible until ring 92 abuts outer spacer 48. In this initial position (FIG. 3), outer wing bends 103 will be spaced inwardly from interior abutment surface 28, and latches 106 of latching verification legs 96 will be spaced inwardly of exterior abutment surface 30 and in radial alignment with rim 26.

Figure 4:
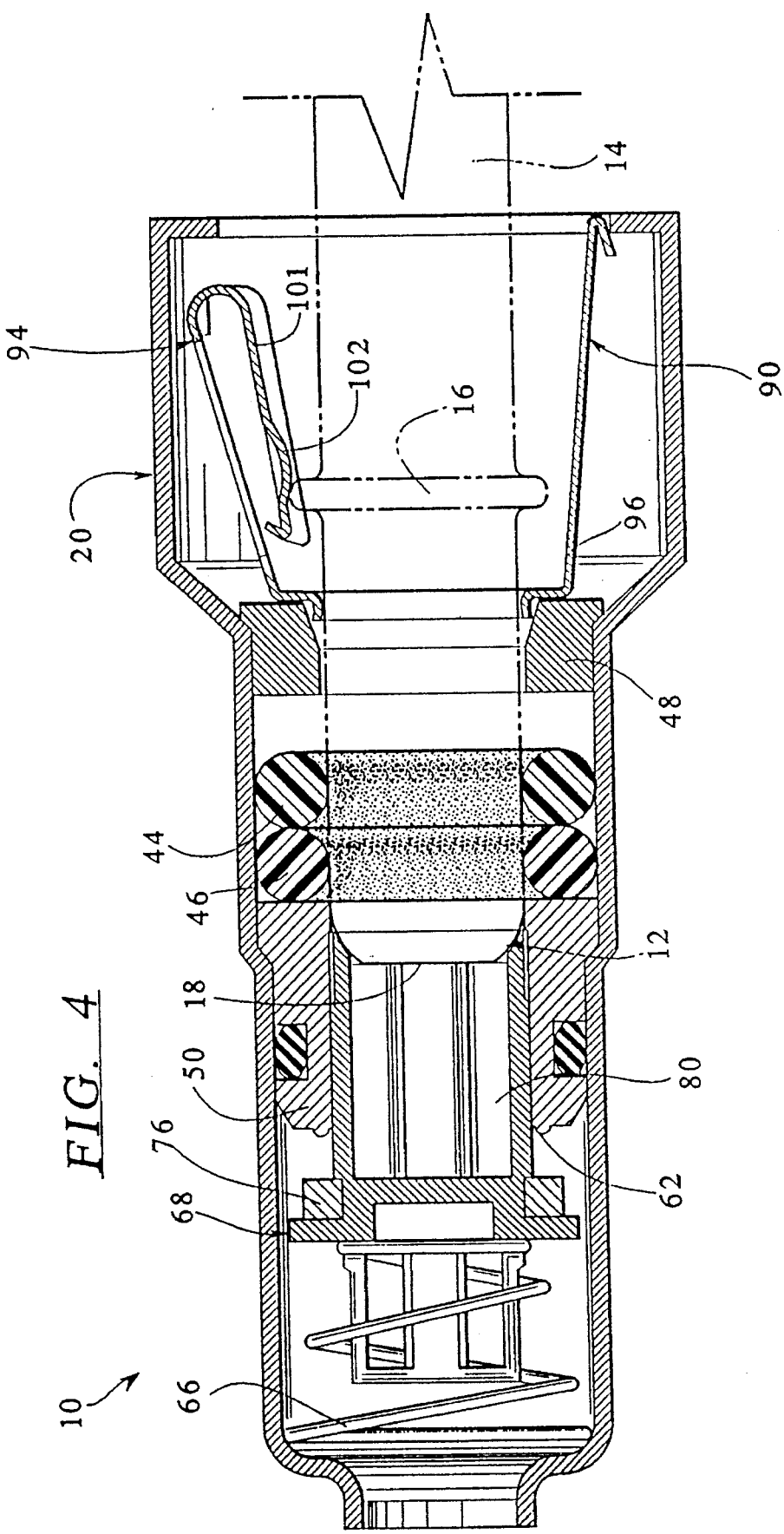
Figure 5:
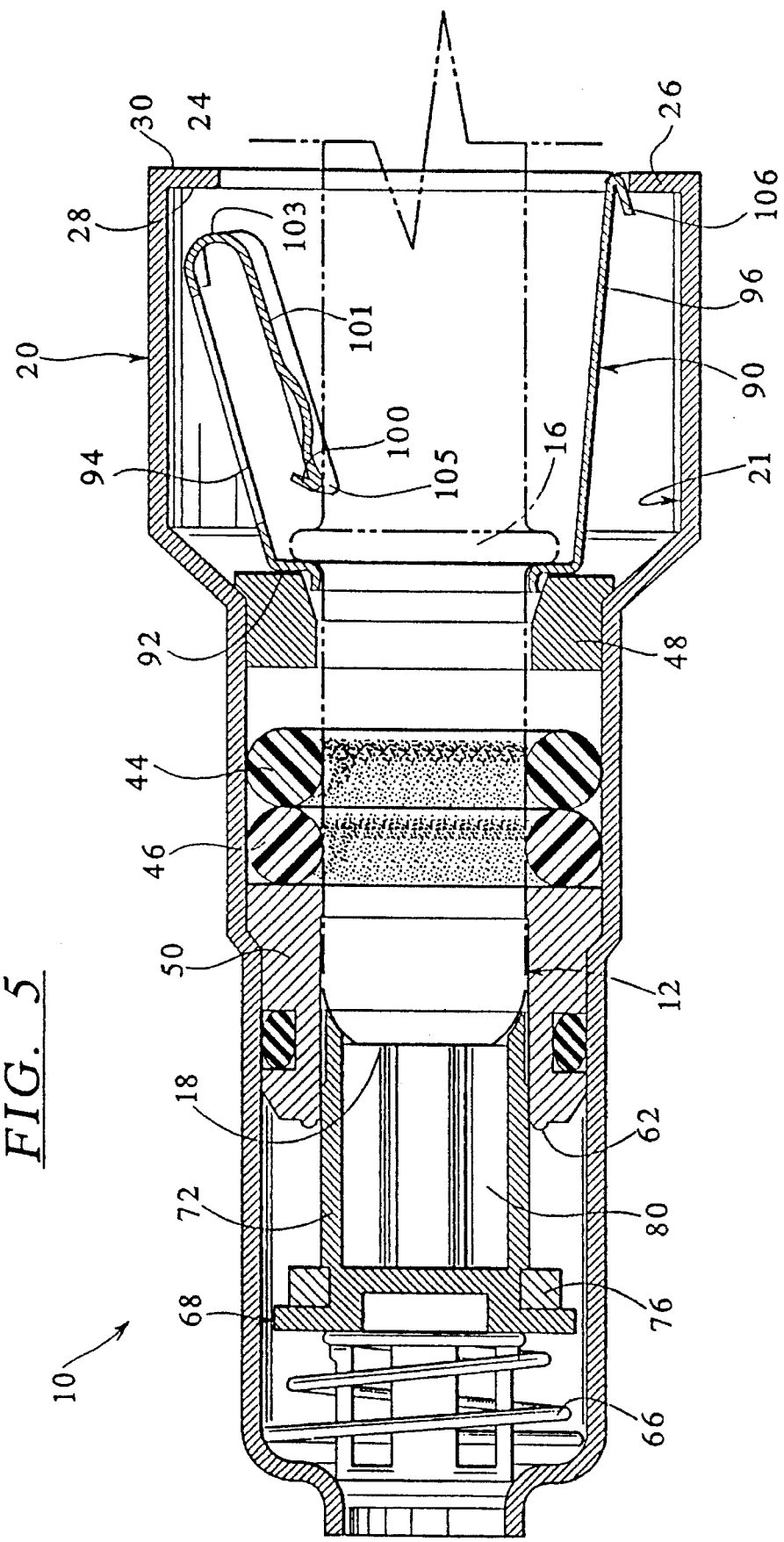

FIGS. 3–5 illustrate the steps in installation leading to the fully assembled coupling of FIG. 1. In FIG. 3, insertion of male member 12 has begun but open end 18 has not yet reached outer cylindrical portion 72 of plunger 68. Until end 18 of member 12 contacts plunger 68 and pushes it forward, coupling 10 remains in a checked position as illustrated in FIG. 3.

In FIG. 4, male member 12 has been inserted such that upset 16 has moved axially inwardly of bumps 102 formed on retention leg members 101. Initially, leg members 101 resist insertion of male member 12. Bumps 102 enhance this resistance. With application of sufficient force, however, leg members 101 flex outwardly to allow passage of upset 16. Once upset 16 has passed bumps 102, resistance to inward insertion diminishes significantly.

Also in FIG. 4, tube end 18 has moved past "O" ring seals 44 and 46 to contact plunger 68. Plunger 68, guided by sleeve 50, is moved axially inwardly. The guidance provide by sleeve 50 is important as radial instability of plunger 68 could cause leakage and/or breakdown of the check valve. Spring 66 is compressed in response. Seal 76 is unseated from valve seat 62 and windows 80 are exposed to bore 21. Thus, two-directional flow through the coupling may begin. It is important to note that no flow through the coupling occurs until tube end 18 has moved fully past "O" ring seals 44 and 46, fully sealing coupling 10.

Latching verification legs 96 have a greater internal diameter than the external diameter of upset 16. Thus, the presence of legs 96 does not hinder or affect insertion of male member 12. Likewise, inward insertion of male member 12 does not affect or change the position of legs 96. In the assembly steps illustrated in FIGS. 3 and 4 the position of legs 94 changes (they have flexed outwardly) while the position of legs 96 remains unchanged.

In FIG. 5, male member 12 has been inserted to a maximum inward axial position. Upset 16 abuts retainer ring 92 which, in turn, abuts outer spacer 48 to prevent further insertion of male member 12. End 18 of member 12 has moved plunger 68 to a fully open position. Seal 76 is separated from valve seat 62, and windows 80 of outer cylindrical portion 72 extend inwardly of sleeve 50. Retention leg members 101 have snapped back into place outward of upset 16. The position of latching verification legs 96, however, remains unchanged.

The final assembly step consists of "pulling back" on male member 12 until upset 16 abuts second bends 100 of retention legs 94 and inner wing bends 105. As male member 12 is pulled back further, the contact between second bends 100 and upset 16 causes outward axial displacement of retainer 90 until outer wing bends 103 contact interior abutment surface 28 of connector body 20. At this point, male member 12 cannot be pulled back any further, providing a physical verification of a proper coupling.

When male member 12 has been pulled back in this manner, latching verification legs 96 are displaced outwardly along with retainer 90. This motion leads to the fully assembled position shown in FIG. 1. The check valve remains open even after the pull-back operation. As shown, latches 106 move outwardly of entrance 24 to wrap around rim 26 and engage exerior abutment surface 30 of connector body 20. Thus, a proper coupling may be visually verified by the presence of latches 106. Latches 106 are of functional significance as well—the engagement of latches 106 with exterior abutment surface 30, in conjunction with the engagement of outer wing bends 103 with interior abutment surface 28, fixes the axial position of retainer 90.

The chances of an assembler skipping or missing the coupling verification step are decreased, since the step has functional merits as well. The pull back operation, in addition to providing a visual verification of the coupling, actually adds strength to the coupling. Thus, it is a necessary step in achieving a proper coupling rather than solely a verification step which may be skipped without detection.

Various features of the present invention have been explained with reference to the embodiments shown and described. It must be understood, however, that modification may be made without departing from the spirit and scope of the invention.

I claim:

1. A quick connector coupling for forming a joint in a fluid line system comprising:

a female connector body defining a bore, said bore extending axially inwardly into said connector body from an entrance, a radial rim being defined in said connector body adjacent said entrance, said radial rim defining an interior abutment surface and an exterior abutment surface;

a male member received within said bore of said connector body and having an enlarged upset portion; and a retainer disposed within said bore of said connector body and including a base surrounding said male member axially inwardly of said upset portion, retention legs extending axially and radially outwardly from said base and having members which extend between said upset portion of said male member and said interior abutment surface to retain said male member within said bore, and latching verification legs offset ninety degrees from said latching verification legs and extending axially and radially outwardly from said base, said verification legs having portions extending outwardly of said bore and engaging said exterior abutment surface to fix the axial position of said retainer and to provide visual verification of a proper connection.

2. A quick connector coupling as recited in claim 1 wherein said retention legs and said latching verification legs extend axially and radially outwardly from a ring which surrounds said male member axially inwardly of said upset portion.

3. A quick connector coupling as recited in claim 2 wherein there are two of said retention legs and two of said latching verification legs.

4. A quick connector coupling as recited in claim 3 wherein said retention legs and said latching verification legs are spaced equidistantly around the circumference of said ring.

5. A quick connector coupling as recited in claim 4 wherein said retention legs are spaced in 180 degree opposition about said ring and said latching verification legs are spaced in 180 degree opposition about said ring.

6. A quick connector coupling as recited in claim 1 wherein said portions of said latching verification legs which extend outwardly of said bore comprise latches which wrap around said radial rim and engage said exterior abutment surface.

7. A method of forming a quick connector coupling joint in a fluid line system comprising the steps of:

(1) providing a female connector body defining a bore which extends axially inwardly into said connector body from an entrance, a radial rim being defined in said connector body adjacent said entrance, said radial rim defining an interior abutment surface and an exterior abutment surface;

(2) providing a male member insertable into said bore, said male member having an enlarged upset portion;

(3) providing a retainer having a base, retention legs extending away from said base to first bends, said retention legs extending away from said first bends towards said base and terminating in second bends spaced from said base, and latching verification legs extending away from said base and terminating in latch portions;

(4) disposing said retainer in said bore of said connector body such that said latch portions of said latching verification legs are spaced axially inwardly of said exterior abutment surface;

(5) inserting said male member into said bore until said upset portion is axially inwardly of said second bends of said retention legs; and (6) displacing said male member axially outwardly until said latch portions of said latching verification legs engage said exterior abutment surface of said connector body.

8. A quick connector coupling comprising:

a hollow female connector body defining an interior abutment surface and an exterior abutment surface; a male member received in said connector body and having a radially enlarged upset; and a retainer disposed within said connector body, said retainer having retention legs and latching verification legs spaced about and extending outwardly from a base, said male member being movable in a first direction to a first position wherein said retention legs are positioned between said upset and said interior abutment surface to retain said male member in said connector body, and said male member being movable from said first position in a second direction opposite to said first direction, said retainer moving with said male member in said second direction to a second position wherein said latching verification legs extend partially out of said connector body and engage said exterior abutment surface to fix said retainer relative to said connector body and to provide visual verification of a proper connection.

* * * * *